United States Patent …

(12) United States Patent
Ohshita et al.

(10) Patent No.: US 7,347,787 B2
(45) Date of Patent: Mar. 25, 2008

(54) JOINT BOOT

(75) Inventors: Takenori Ohshita, Osaka (JP); Eiichi Imazu, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 226 days.

(21) Appl. No.: 10/529,398

(22) PCT Filed: Nov. 24, 2004

(86) PCT No.: PCT/JP2004/017388

§ 371 (c)(1),
(2), (4) Date: Mar. 28, 2005

(87) PCT Pub. No.: WO2006/057031

PCT Pub. Date: Jun. 1, 2006

(65) Prior Publication Data

US 2007/0026953 A1    Feb. 1, 2007

(51) Int. Cl.
*F16C 1/26*    (2006.01)
*F16J 3/00*    (2006.01)

(52) U.S. Cl. .................... 464/173; 464/175; 277/635; 277/636

(58) Field of Classification Search ............... 464/173, 464/175; 277/635, 636
See application file for complete search history.

(56) References Cited

U.S. PATENT DOCUMENTS

| | | | |
|---|---|---|---|
| 4,280,340 A | 7/1981 | Goguet | |
| 4,320,632 A * | 3/1982 | Dore' | 464/111 |
| 5,529,538 A | 6/1996 | Schulz et al. | |
| 6,089,574 A | 7/2000 | Sadr et al. | |
| 6,471,595 B1 | 10/2002 | Neviani | |
| 6,672,596 B2 * | 1/2004 | Devers | 277/636 |
| 2003/0069075 A1 * | 4/2003 | Furuta | 464/175 |
| 2004/0056434 A1 | 3/2004 | Wolf et al. | |
| 2005/0192107 A1 | 9/2005 | Toriumi et al. | |

FOREIGN PATENT DOCUMENTS

| | | |
|---|---|---|
| EP | 0 915 264 A2 | 5/1999 |
| JP | 2-22463 | 2/1990 |
| JP | 09-096319 | 4/1997 |

(Continued)

*Primary Examiner*—Daniel P. Stodola
*Assistant Examiner*—Victor MacArthur
(74) *Attorney, Agent, or Firm*—Westerman, Hattori, Daniels & Adrian, LLP.

(57) ABSTRACT

In a joint boot to be mounted on an outer housing having a non-circular outer contour, intended to axial positioning without impairing the mountability to the outer housing. The joint boot (10) comprises a boot body (18) including a large-diameter attachment part (12), a small-diameter attachment part (14) and a bellows part (16), and a bushing (20) interposed between the outer housing and the large-diameter attachment part. The bushing assumes on its outer peripheral surface a circular form in cross-section and is provided, on its inner peripheral part to be externally fitted and fixed to the outer housing, with plural lobe portions (26) in a circumferentially distributed manner. On the inner peripheral surface of the bushing, protrusions (56) mating with circumferentially extending grooves (54) formed on the outer peripheral surface of the outer casing are provided in a position deviating from an external fitting area (Q) by the large-diameter attachment part in the axial direction of the bushing.

10 Claims, 8 Drawing Sheets

FOREIGN PATENT DOCUMENTS

| | | |
|---|---|---|
| JP | 11-013883 | 1/1999 |
| JP | 2002-340013 A | 11/2002 |
| JP | 2003-329059 A | 11/2003 |
| JP | 2004-211849 A | 7/2004 |
| JP | 2004-211850 A | 7/2004 |
| JP | 2004-316694 A | 11/2004 |

* cited by examiner

JOINT BOOT

TECHNICAL FIELD

This invention relates to a bellows-like joint boot mainly for use in tripod type of constant velocity joints for automobiles.

BACKGROUND ART

As one of constant velocity joints used for a drive shaft, etc. of a vehicle, a tripod type of joint is known.

Figure 9:
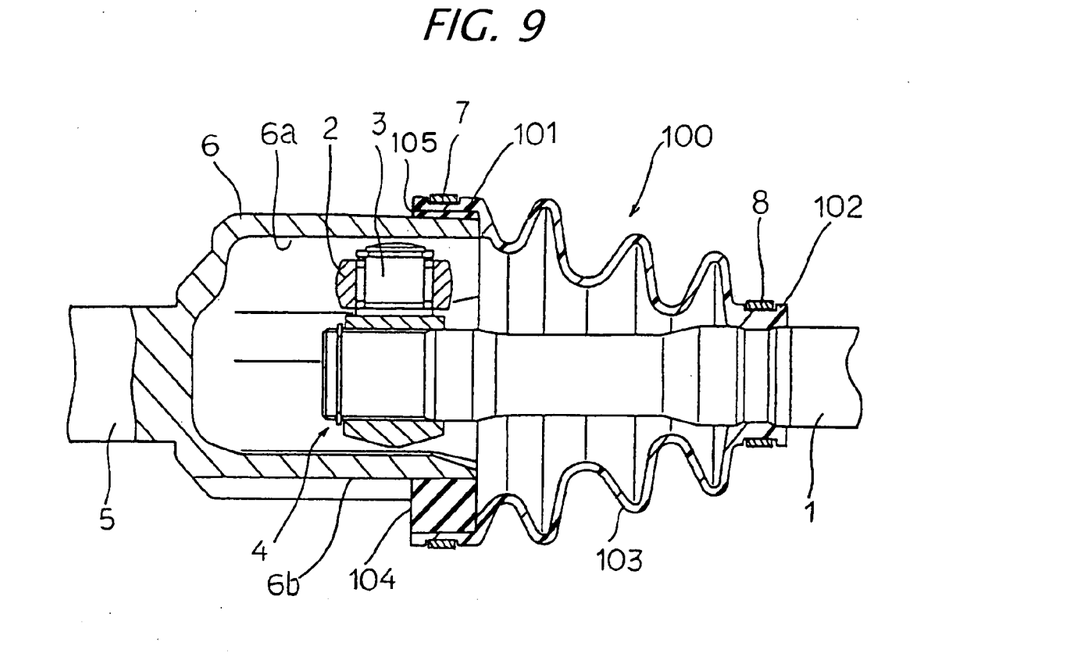
FIG. 9 is a sectional view of a conventional joint boot in the state that it is assembled to the constant velocity joint.
Figure 10:
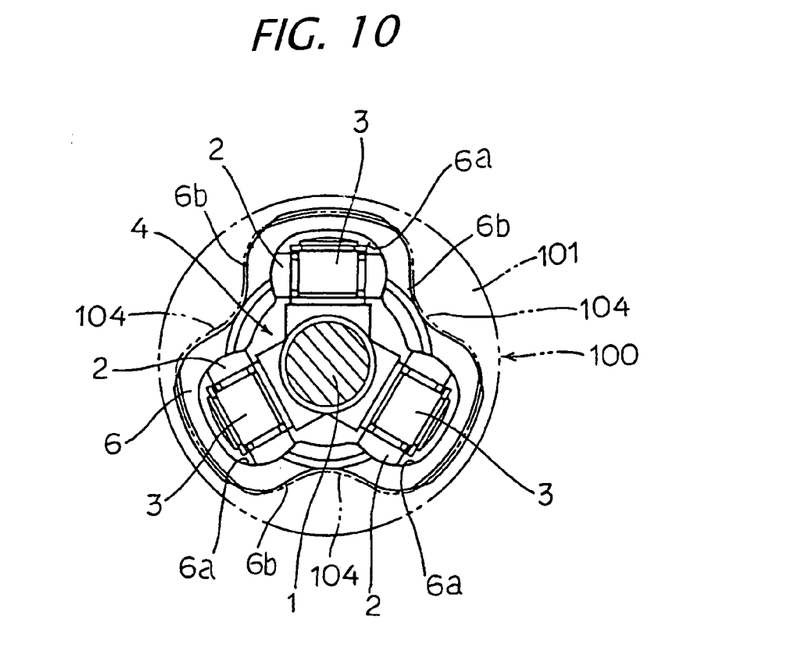
FIG. 10 is a side elevation of the constant velocity joint above.

The tripod type constant velocity joint includes, as exemplarily shown in FIGS. 9 and 10, a tripod 4 constructed in a manner that three trunnions 3 each having a roller 2 protruding in the normal direction to the axis are provided on one shaft 1 of an input and an output shafts and, and an outer housing 6 disposed at an end of the other shaft 5. The outer housing 6 has, on its inner periphery, three axially extending slide grooves 6a corresponding to the tripod 4. The constant velocity joint is constructed so that the rollers 2 of the tripod 4 are fitted in the slide grooves 6a to be axially slidable, thereby simultaneously enabling angulation of both shafts 1, 5 and enabling torque to be transferred between them.

In such constant velocity joints, it is general that for the purpose of preventing the ingress of dust or extraneous matter inside the joint or of retaining the grease sealed therein, a joint boot 100 moderately susceptible of extension and contraction and flexural deformation and assuming a bellows shape is mounted in a manner covering the part of the shaft 1 on the tripod 4 side from the outer housing 6. The joint boot 100 is formed at its axial one end as a large-diameter attachment part 101, which is fitted to the outer periphery of the outer housing 6 and fixed by means of a damping member 7 such as ring-like band and at its other end as a small-diameter attachment part 102, which is fixed to the outer periphery of the shaft 1 on the tripod 4 side by means of a clamping member 8 such as a ring-like band, wherein the both parts 101, 102 are linked integrally by a bellows part 103.

As illustrated in FIG. 10, the outer housing 6 is provided on the outer periphery thereof with three recessed portions 6b circumferentially equidistantly disposed and corresponding to the arrangement of the slide grooves 6a on the inner periphery thereof, and accordingly, the outer peripheral configuration of the outer housing 6 is non-circular, assuming a circumferentially tongued and grooved form (salient and reentrant form). In order to enable the mounting on the non-circular outer housing 6 like this, there is known a so-called two-piece type joint boot constructed so that between the outer housing 6 and the large-diameter attachment part 101, a bushing 105 in a discrete body may be interposed (cf. Patent Reference 1). The bushing 105 assumes, on its outer peripheral surface, a circular form in cross-section and is provided, in its inner peripheral area, with a plurality of lobe portions 104 protruding radially inwardly in a circumferentially distributed manner so as to conform to the recessed portions 6b of the outer housing.

Patent Reference 1: U.S. Pat. No. 5,529,538

PROBLEMS TO BE SOLVED BY THE INVENTION

In the joint boot as disclosed in Patent Reference 1 above, the outer housing has grooves defined on its outer peripheral surface while the bushing has on its inner peripheral surface protrusions mating with the grooves, and it is supposed that the axial positioning of the joint boot to the outer housing is effected by mating of the both. In that Reference, the aforesaid protrusions are disposed within an external fitting area by the large-diameter attachment part in the axial direction of the bushing.

However, a problem with the structure of the protrusions disposed in the external fitting area by the large-diameter attachment part is that when the joint boot will be mounted on the outer housing in the state that the large-diameter attachment part is externally fitted on the bushing, the bushing is difficult to expand outwardly because the outer peripheral surface of the bushing is constrained by the large-diameter attachment part and accordingly, it is difficult to mount it to the outer housing. In particular, in a case where in order to enhance the durability of the bellows part, the boot proper is formed from a material of a higher hardness than the bushing, the area of the protrusions is more difficult to expand because the outer periphery of the bushing is constrained by the large-diameter attachment part of a high rigidity, so that the mountability is impaired.

In view of the aspects thus described, the present invention has been made, and the invention is directed to a joint boot to be attached to an outer housing having a non-circular outer contour, and aimed at enabling the axial positioning of the joint boot to an outer housing without impairing the mountability.

SOLUTION MEANS OF THE PROBLEMS

The joint boot with which this invention is concerned comprises a boot body including a large-diameter attachment part to be mounted on an outer housing of an outer peripheral configuration having a plurality of recessed portions in the circumferential direction, a small-diameter attachment part to be mounted on a shaft, and a bellows part integrally linking both, and a bushing interposed between the outer housing and the large-diameter attachment part, wherein an outer peripheral surface of the bushing, on which the large-diameter attachment part is externally fitted, assumes a circular form in cross-section and an inner peripheral surface of the bushing, which is to be externally fitted and fixed to the outer housing, is formed with a plurality of lobe portions mating in the recessed portions in a circumferentially distributed manner. And the joint boot is characterized in that the bushing is formed, on the inner peripheral surface thereof, with protrusions fitting in grooves formed on an outer peripheral surface of the outer housing and extending in the circumferential direction; and the protrusions are positioned at a location deviating from the external fitting area by the large-diameter attachment part in the axial direction of the bushing.

Here, by reason of the mating of the protrusions disposed on the inner peripheral surface of the bushing with the grooves disposed on the outer peripheral surface of the outer housing, positioning of the joint boot to the outer housing in the axial direction is effected. Further because the protrusions are positioned outside the external fitting area by the large-diameter attachment part, upon mounting on the outer housing, the protrusion area can expand without being constrained by the large-diameter attachment part and hence, it is easy to insert the outer housing into the bushing. Therefore the axial positioning can be performed without impairing the mountability to the outer housing.

The protrusions for positioning may be disposed either at a location deviating on the bellows part side from the external fitting area by the large-diameter attachment part or at a location deviating oppositely to the bellows part from it.

In the case where the protrusions are provided at a location deviating on the opposite side to the bellows part from the external fitting area by the large-diameter attachment part, it is advantageously possible to make the axial length of the large-diameter attachment part of the boot proper shorter as compared with the case where the protrusions are provided at a location deviating on the bellows part side. More specifically, in the case where the protrusions are disposed on the bellows part side from the external fitting area, it is required to ensure the axial length for forming the protrusions on the bellows part side, concurrently with which the axial length of the large-diameter attachment part of the boot proper may become longer by that length whereas in the case where the protrusions are disposed at a location deviating opposite to the bellows part, the axial dimension of the large-diameter attachment part is not affected thereby.

In this case, it is preferred that an upset part capable of stopping an edge face of the large-diameter attachment part in the axial direction be formed on the outer periphery of the bushing and the protrusions be disposed on the inner peripheral surface of the upset part of the bushing. By the provision of the upset part like this, it is possible to enhance the assembling properties. Further because the protrusions are provided on the inner peripheral surface of the upset part, the axial dimension of the bushing is no longer lengthened only for the purpose of positioning. In particular, in a case where the axial dimension of the upset part is lengthened taking account of the aforementioned assembling properties, a sufficient axial dimension for the provision of the protrusions at the inner periphery of the upset part is secured, which is advantageous.

Further in this case, it is also preferred that the bushing be provided, over the whole circumference of the inner peripheral surface thereof, with a faying inner peripheral portion smaller in diameter than the outer housing so that the bushing can be fayed and fitted externally to the outer housing, and concurrently, at one end of the bushing opposite to the bellows part, with an upset inner peripheral portion over the whole circumference of the inner peripheral surface thereof, the upset inner peripheral portion assuming a straight hole larger in diameter than the outer housing and guiding the outer housing when externally fitting the bushing to the outer housing; and that the protrusions be disposed between the faying inner peripheral portion and the upset inner peripheral portion. Due to the provision of the faying inner peripheral portion stated above, the faying property of the bushing to the outer housing can be enhanced. Further due to the provision of the upset inner peripheral portion, it is possible to facilitate fitting the bushing externally to the outer housing, despite such structure that the bushing can be fayed and externally fitted on the outer housing. Moreover because the protrusions formed on the inner peripheral surface of the upset part are disposed between the faying inner peripheral portion and the upset inner peripheral portion, the upset inner peripheral portion is thus terminated not to reach the external fitting area by the large-diameter attachment part and consequently, it is possible to introduce smoothly the top of the outer housing from the upset inner peripheral portion via the protrusions into the faying inner peripheral portion.

On the other hand, in the case where the protrusions are disposed at a location deviating on the bellows part side from the external fitting area by the large-diameter attachment part, it is preferred that the large-diameter attachment part be defined on its outer peripheral surface with a recessed portion for fixation circumferentially extending and receiving a damping member and that an inner peripheral area of the large-diameter part on the bellows part side from the recessed portion for fixation surround the outer peripheral surface of the bushing at a clearance gap thus defining an axially surrounded area, in which the protrusions are disposed on the inner peripheral surface of the bushing. In this case, the protrusions area is allowed to expand outwardly because of the clearance gap upon mounting on the outer housing, so that the mountability can be secured.

In the joint boot of this invention, the protrusions need not be provided in the whole circumference of the inner peripheral surface of the bushing, but preferably are provided only at arc-like wall portions located between circumferentially adjacent lobe portions, whereby the mountability to the outer housing is improved.

In the joint boot of this invention, when the bushing is formed from a softer material than the boot proper, it is possible to enhance the durability of the bellows part and simultaneously to enhance the faying (dose or tight mating) property of the bushing to the outer housing.

Again in the joint boot of this invention, the lobe portions may include each an inner wall portion radially inwardly jutting in a curved form, an outer wall portion of an arc form constituting part of the outer peripheral surface of the bushing, a central strut wall linking these inner and outer wall portions in the middle of both relative to the circumferential direction, and lateral strut walls connecting both the inner and outer wall portions on both sides of the central strut wall, whereby four relief holes are formed and juxtaposed in the lobe portion in the circumferential direction. Here, the inner wall portion of the lobe portion is supported by three strut walls, i.e., the central strut wall and the lateral strut walls and hence, for example, when the large-diameter attachment part is tightened to be fixed from externally by means of a damping member, a variation in damping force can be most effectively reduced. More specifically stated, according to the constitution of the three strut walls, when they are disposed equidistantly in the circumferential direction, it is possible to support the central area of the inner wall portion, which juts out most largely radially inwardly, by the central strut wall and simultaneously to dispose the lateral strut walls on both sides thereof so that the clamping force can be equalized to the utmost. Further according to the three strut walls, a relatively simple construction in the aspect of a mold geometry will suffice and besides, some degree of cross-sectional area for cores for molding the relief holes can be ensured, so that it is possible to suppress deformation upon application of an injection pressure. As a consequence, while ensuring the moldability, it is possible to reduce the variation in damping force to equalize the contact pressure which the inner wall portions exert on the outer housing in the circumferential direction to the utmost, thus enhancing the sealing properties.

In the joint boot described above, when the lateral strut walls slant in such a manner that as they extend outwards, they approach the central strut wall, it is possible to secure demolding property of the cores for molding the relief holes. Moreover it is possible to connect the lateral strut walls, which support the outward areas of the inner wall portion, to the inner wall portion at a nearly vertical angle, so that the contact pressure the inner wall portion exerts on the outer housing can be more equalized in the circumferential direction.

EFFECTS OF THE INVENTION

In accordance with this invention, in the joint boot to be mounted on an outer housing assuming a non-circular configuration in outer periphery as is the case with a tripod type constant velocity joint, the axial positioning of the joint boot to the outer housing can be effected without impairing the mountability to the outer housing.

BEST MODE FOR CARRYING OUT THE INVENTION

The embodiments of this invention will be hereinafter described with reference to the accompanying drawings.

Figure 1:
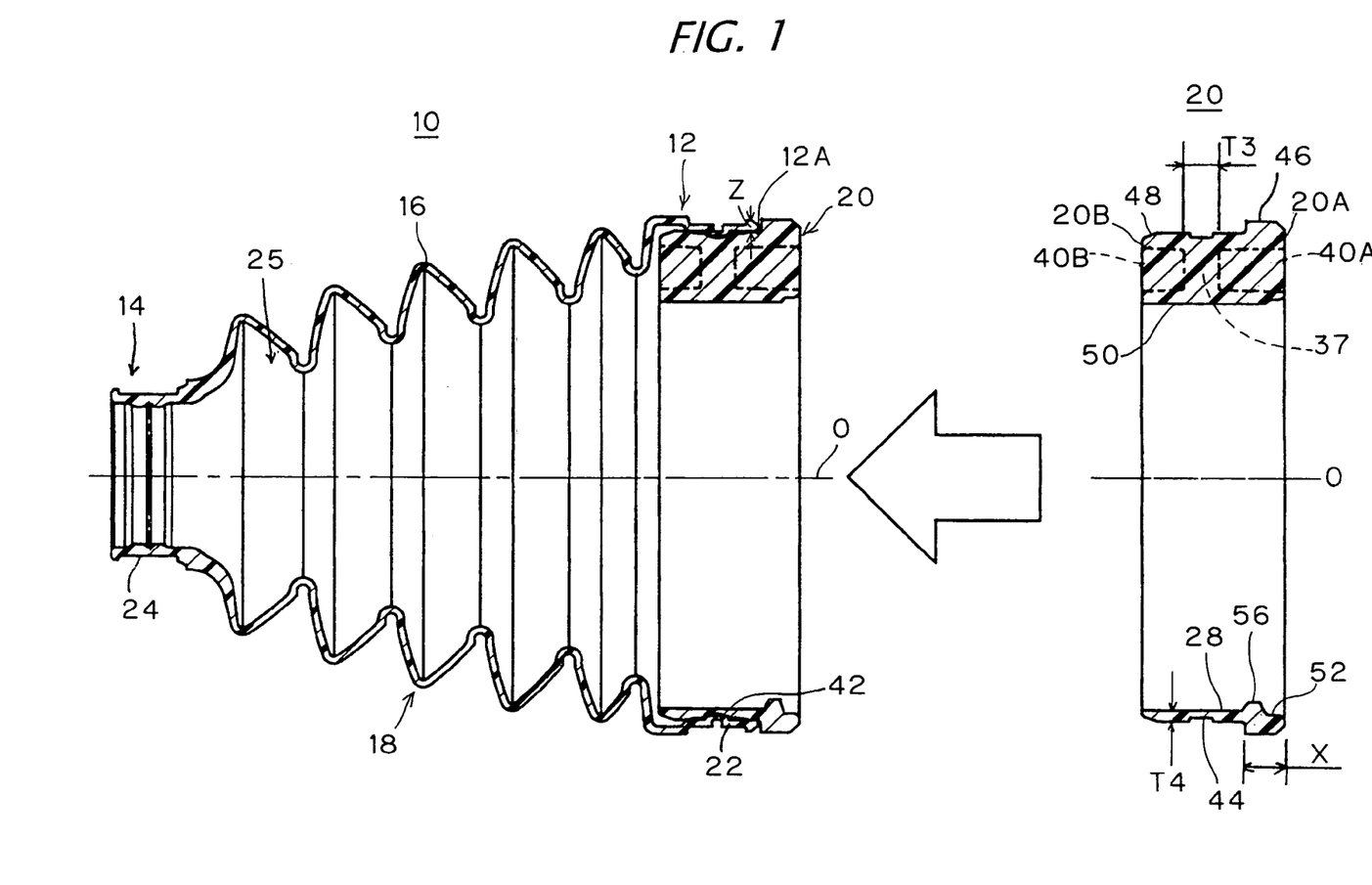
FIG. 1 is a longitudinal sectional view of a joint boot pertaining to an embodiment of the invention.

FIG. 1 is a cross-sectional view of a joint boot 10 relating to one embodiment, wherein the joint boot 10 is adapted to be installed on a tripod type constant velocity joint for automobiles as illustrated in FIGS. 9 and 10 mentioned above.

Figure 7:
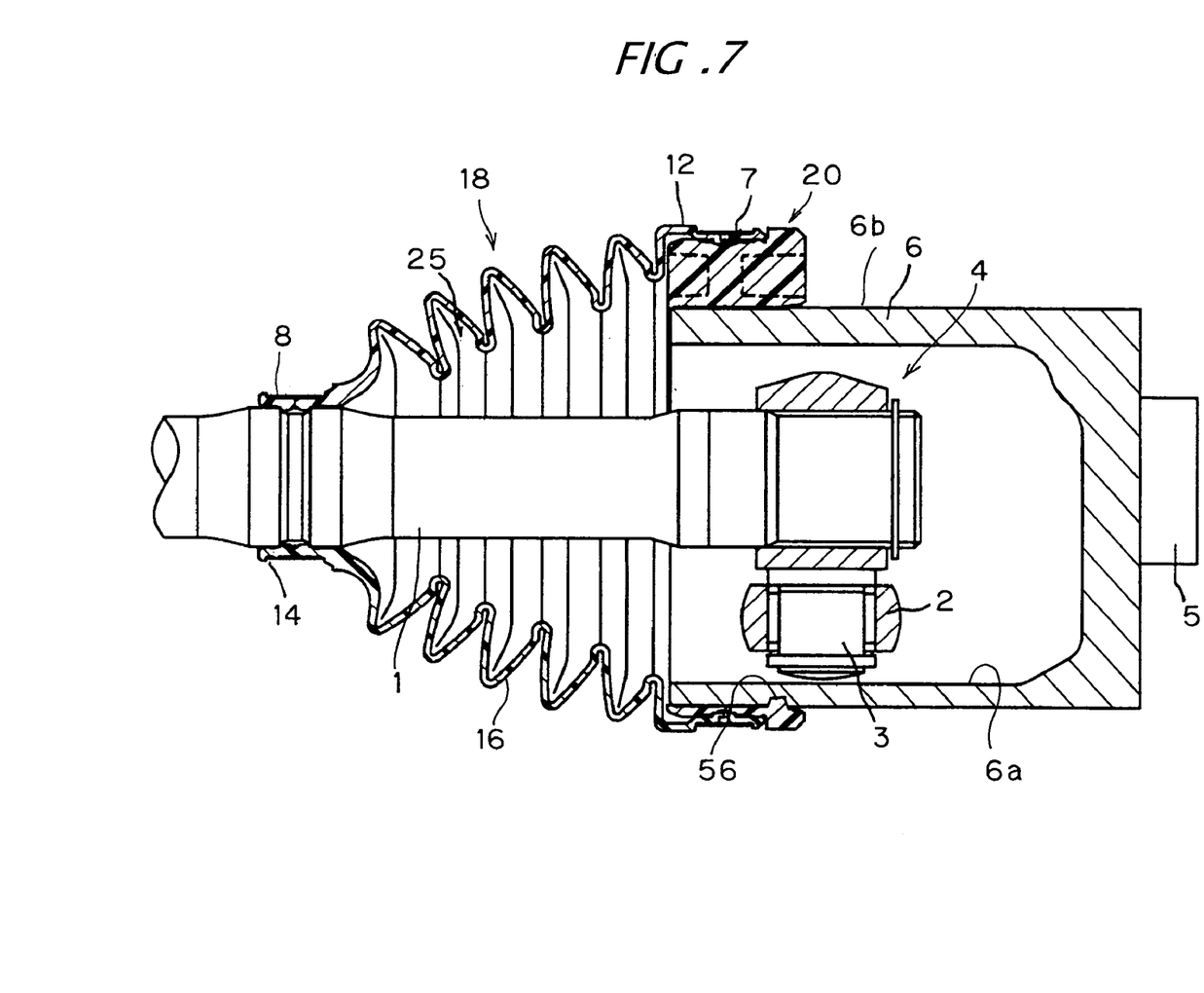
FIG. 7 is a sectional view showing the state that the joint boot is assembled to the constant velocity joint.

The aforesaid constant velocity joint includes, as shown in FIG. 7, the tripod 4 having three trunnions 3 with rollers 2 attached to the input shaft 1 in a manner projecting in the normal direction to the axis, and the outer housing 6 attached to the end of the output shaft 5. The outer housing 6 has three axial slide grooves 6a corresponding to the tripod 4 on its inner periphery and three recessed portions 6b equidistantly disposed in the circumferential direction on its outer periphery, corresponding to the arrangement of the slide grooves 6a, whereby the outer peripheral contour of the outer housing 6 is configured in a non-circular form, assuming a circumferentially tongued and grooved configuration.

The joint boot 10 is an assembly body comprised of a boot proper 18, which incorporates a large-diameter attachment part 12 to be attached to the outer housing 6, a small-diameter attachment part 14 to be attached to the shaft 1 and a bellows part 16 joining the both integrally, and a bushing 20 interposed between the outer housing 6 and the large-diameter attachment part 12.

The boot body 18 is molded by blow molding using a thermoplastic elastomer resin, for example, TPEE, TPO, etc. On the other hand, the bushing 20 is molded in a discrete body from the boot body 18, using a softer material than the boot body 18 by injection molding, for example, using thermoplastic elastomer resin such as TPO or rubber material such as chloroprene rubber. Here, it is preferred that the hardness of the boot proper 18 be preset at 40 to 50 degrees in JIS D hardness and the hardness of the bushing 20, at 55 to 85 degrees in JIS A hardness (both according to JIS K 6253). If the hardness of the bushing 20 is less than 55 degrees in JIS A hardness, it is too soft to deteriorate the sealing properties whereas if the hardness exceeds 85 degrees, it is too hard, so that there is a possibility of reducing the clamping capability. On the other hand, if the hardness of the boot proper 18 is less than 40 degrees in JIS D hardness, then the rigidity is too low, so that the bellows part 16 is susceptible to deformation by impact force whereas if the hardness exceeds 50 degrees, it is too hard and the durability is likely to be lowered.

The large-diameter attachment part 12 of the boot proper 18 has a short cylinder shape assuming a circular form in cross-section both on inner and outer peripheral surfaces thereof, and is provided on the outer peripheral surface with a recessed portion 22 for fixation for receiving a ring-form clamping member 7. The small-diameter attachment part 14 assumes a short cylinder shape so as to be externally fitted and fixed to the shaft 1 on the tripod 4 side and is provided, on its outer peripheral surface, with a recessed portion 24 for fixation, extending circumferentially, for receiving a ring-form damping member 8. The large-diameter attachment part 12 and the small-diameter attachment part 14 are disposed coaxially, namely to have a common axis O. The bellows part 16 is a tapered bellows body that is formed to be gradually tapered down from the large-diameter attachment part 12 toward the small-diameter attachment part 14, its cavity defining a grease-filled space 25.

Figure 2:
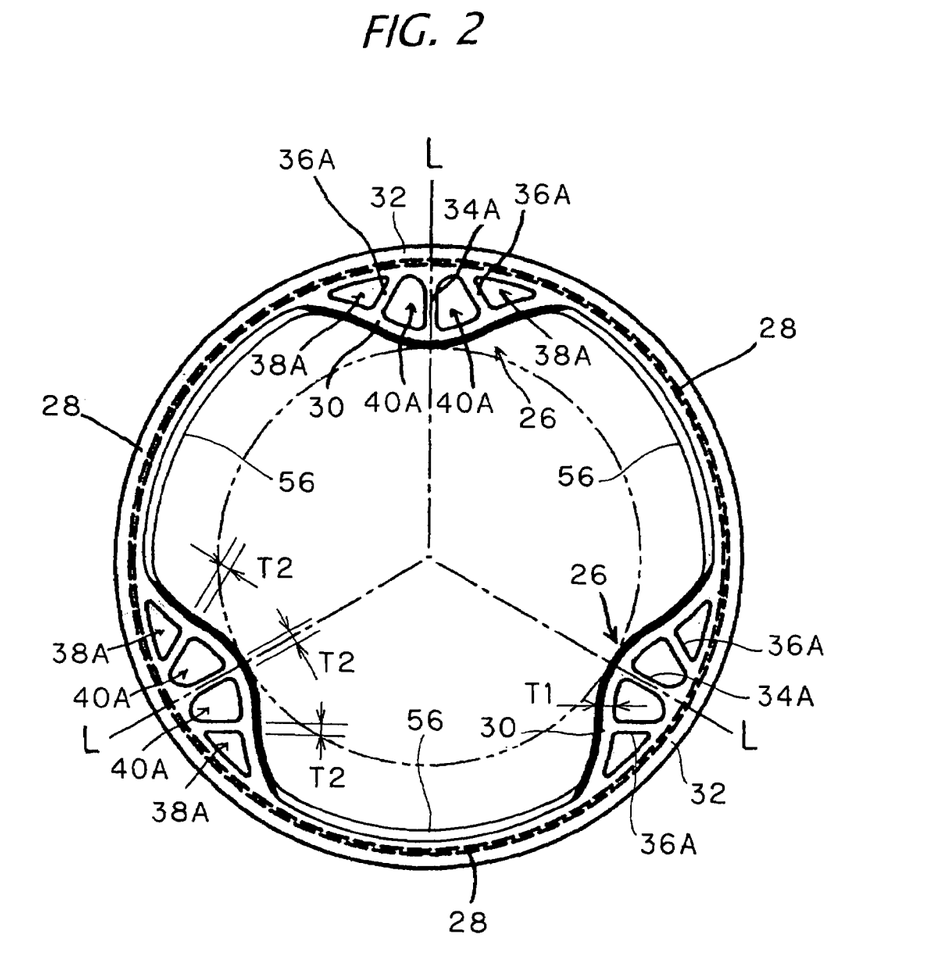
FIG. 2 is an illustration of a bushing of the joint boot above as viewed from outwardly of one edge face thereof.
Figure 3:
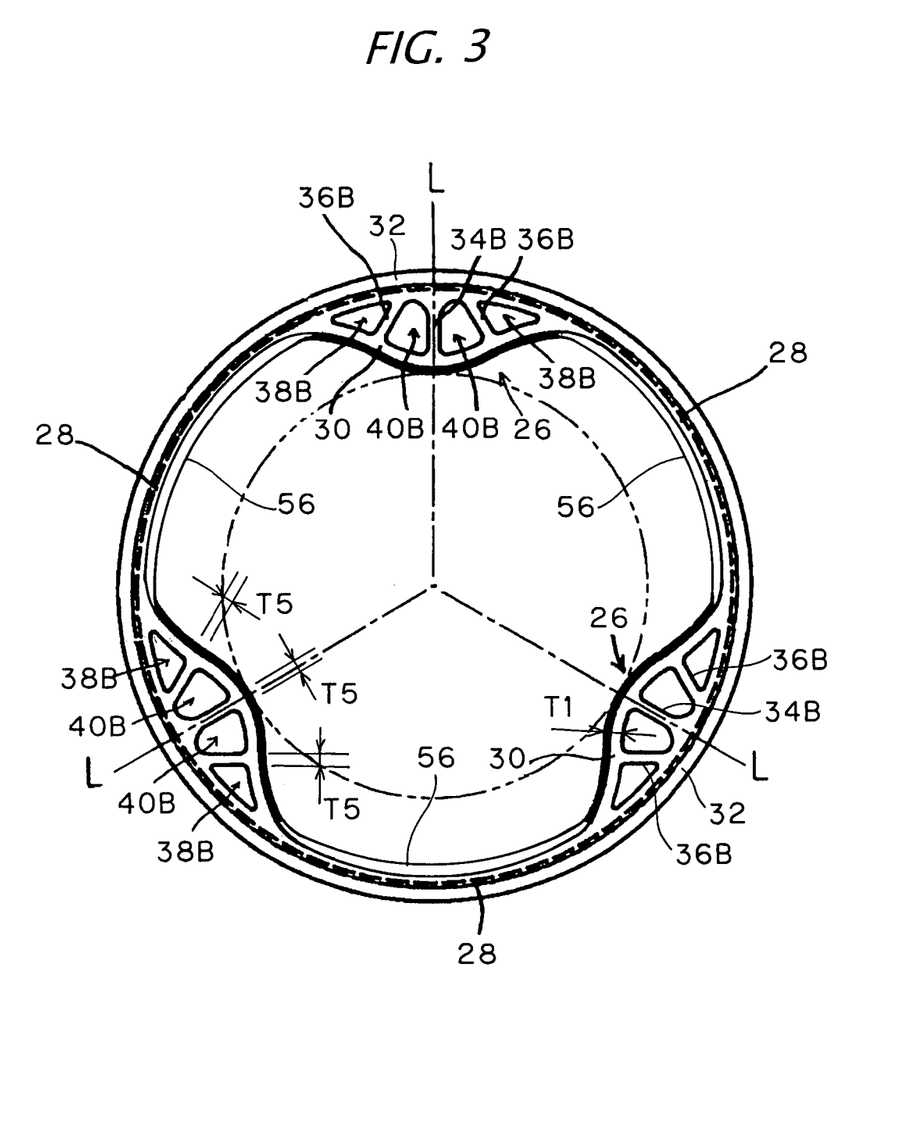
FIG. 3 is an illustration of the same bushing as viewed from outwardly of the other edge face.

As shown in FIGS. 2 and 3, the bushing 20 assumes, on the outer peripheral surface on which the large-diameter attachment part 12 is externally fitted, a circular form in cross-section and is provided, on the inner peripheral surface which is externally fitted and fixed to the outer housing 6, with a plurality of lobe portions 26 mating in the recessed portions 6b in a circumferentially distributed manner. The lobe portions 26 protrude radially inwardly and are disposed at equal intervals of 120 degrees in the circumferential direction. More specifically, each of the lobe portions 26 is configured in a gently sloped chevron form in transversal cross-section and in a symmetric form relative to a center line L thereof in the circumferential direction as viewed in the axial direction of the bushing 20, and merges smoothly into arc-like wall portions 28 between mutually adjacent lobe portions 26.

The lobe portion 26 has, as shown in FIGS. 2 and 3, an inner wall portion 30 radially inwardly jutting in a curved form to be mated in the recessed portions 6b and an outer wall portion 32 in an arc form constituting part of the outer peripheral surface of the bushing 20, wherein in a cavity space defined between the inner wall portion 30 and the outer wall portion 32, there are provided a central strut wall 34A; 34B connecting both wall portions 30, 32 in the circumferential middles thereof and a pair of lateral strut walls 36A, 36A; 36B, 36B connecting both wall portions 30, 32 on both sides of the central strut wall. Thereby on the lobe portion 26, four relief holes axially subsiding are juxtaposed in the circumferential direction. More specifically, the relief holes comprise two pairs of first bottomed relief holes 38A, 40A, 40A, 38A (cf. FIG. 2) opening on the side of one edge surface 20A of the bushing 20 and being symmetric relative to the center line L; and two pairs of second bottomed relief holes 38B, 40B, 40B, 38B (cf. FIG. 3) opening on the side of the other edge surface 20B of the bushing 20 and being symmetric relative to the center line L. Accordingly, the strut walls are constituted of first strut walls (the central strut wall 34A and the lateral strut walls 36A, 36A) comparting mutually the first relief holes and second strut walls (the central strut wall 34B and the lateral strut walls 36B, 36B) comparting mutually the second relief holes. Further, there is provided a third strut wall 37 (cf. FIG. 1) that extends circumferentially and supports the inner wall portion 30 by a wall partitioning the first relief holes and the second relief holes. Stated another way, the first relief holes and the second relief holes are provided interposing the strut wall 37 on the axially central side of the bushing 20 on both sides thereof. The four first relief holes 38A, 40A, 40A, 38A are the same in depth. Further the four second relief holes 38B, 40B, 40B, 38B are also the same in depth and the depth thereof is a little shallower than that of the first relief holes 38A, 40A.

Figure 4:
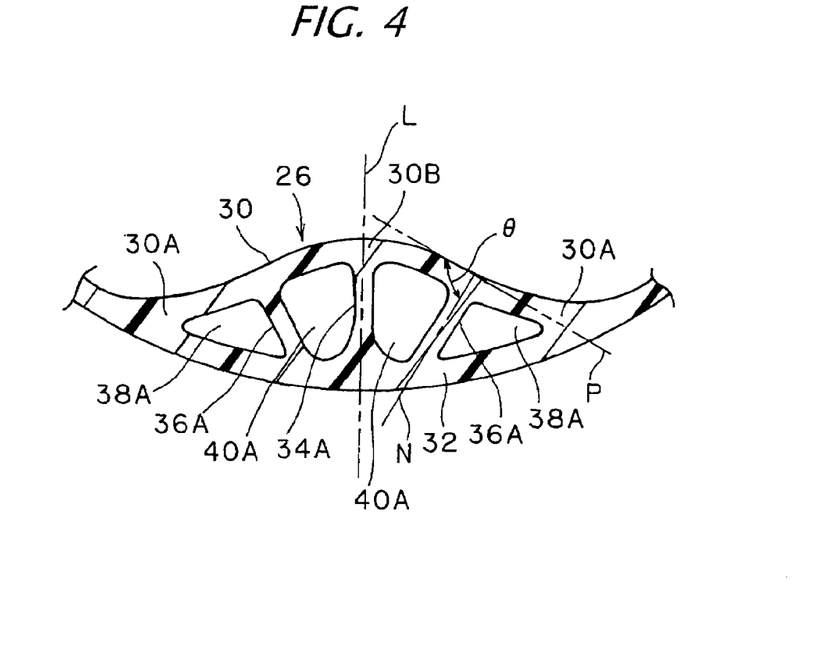
FIG. 4 is an enlarged sectional view of a lobe portion of the bushing at the one end thereof

As shown in FIG. 4, the first central strut wall 34A is a radially extending wall supporting the inner wall portion 30 against the outer wall portion 32 and disposed in the circumferential middle of the former where the inner wall portion 30 radially inwardly juts most largely. The first lateral strut walls 36A serve to support the inner wall portion 30 to the outer wall portion 32 and are disposed obliquely to the central strut walls 34A disposed in a radial fashion from the axis O, not in parallel. The lateral strut wall 36A supports the inner wall portion 30 in an intermediate position between a root area 30A to the outer wall portion and a linking area 30B to the central strut wall at the inner wall portion 30 so that the inner wall portion 30 may be supported by the central strut wall 34A and the lateral strut walls 36A, 36A at circumferentially equal intervals, namely, is connected to the inner wall portion 30 in the intermediate position. Further in this connecting position, the lateral strut wall is disposed to slant in a manner such that as it extends outwardly of the connecting position, it comes dose to the center, namely, approaches the central strut wall 34A so that the lateral strut wall may intersect nearly vertically to the inner wall portion 30. Here, the connecting angle θ of the lateral strut wall 36A to the inner wall portion 30 is preferred to be nearly vertical, and more particularly, the connecting angle θ is preferably in the range of 70 to 110 degrees (i.e., 90±20 degrees), more preferably in the range of 80 to 110 degrees. By the connecting angle θ is meant an angle at which a center line N of the lateral strut wall 36A and a tangential line P on the inner peripheral surface of the inner wall portion 30 intersecting to the center line N make. Due to the constitution that the first strut walls 34A, 36A are provided in this manner, a pair of the first relief holes 40A, 40A located inwards and dose to the center line L assume a trapezoid shape in cross-section whose side on the outer peripheral surface of the bushing 20 is narrowed whereas a pair of the first relief holes 38A, 38A located outwards assume a triangular shape in cross-section.

The structure of the second central strut wall 34B and the lateral strut walls 36B, 36B is the same as that of the first central strut wall 34A and the lateral strut walls 36A, 36A, and consequently, the structure of the second relief holes 38B, 40B, 40B, 38B is also the same as that of the first relief holes 38A, 40A, 40A, 38A in position and shape.

Further a wall thickness T2 of the first strut walls 34A, 36A, a wall thickness T5 of the second strut walls 34B, 36B, a wall thickness T1 of the inner wall portion 30 of the lobe portion 26, and a wall thickness T4 of the arc-like wall portion 28 located between circumferentially adjacent lobe portions 26 are preset to be the same or nearly the same in order to equalize cooling speeds of resin material or rubber material constituting these wall portions. On the other hand, as far as the third strut wall 37 is concerned, a wall thickness T3 of it in the axial direction is set to be thicker than these wall thicknesses T1, T2, T4 and T5. Thereby the clamping force by the clamping member 37 can be securely transferred to the inner wall portions 30.

Figure 5:
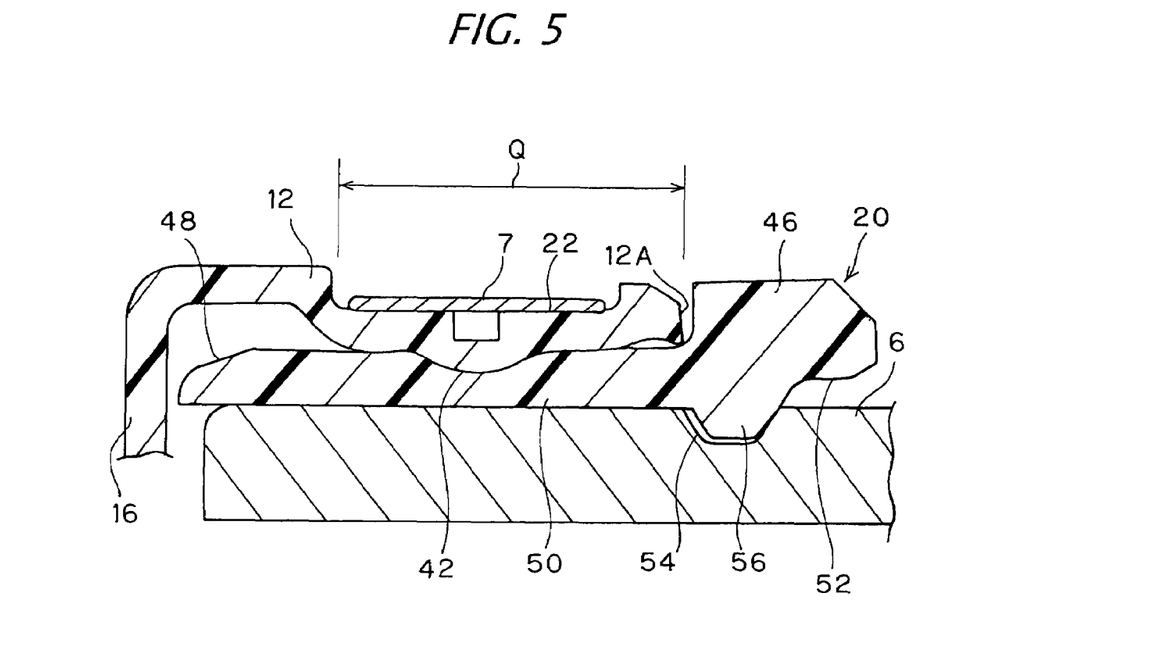
FIG. 5 is an enlarged sectional view of essential parts of the joint boot in its assembled state to a constant velocity joint.

As illustrated in FIGS. 1 and 5, at the inner periphery of the large-diameter attachment part 12 of the boot proper 18 there is provided an annular protrusion 42, whereas the bushing 20 is provided at its outer periphery with a shallow annular groove 44 with which the annular protrusion 42 mates.

Further at the outer periphery of the bushing 20, there is formed an upset part 46 capable of holding and stopping an edge face 12A of the large-diameter attachment part 12 in the axial direction. An axial length X of the upset part 46 is set to be longer than a wall thickness Z of the large-diameter attachment part 12 so that as the mating of the bushing 20 with the large-diameter attachment part 12 progresses, the large-diameter attachment part 12 may not push down the upset part 46, whereby the rigidity of the upset part 46 in the axial direction is enhanced. Here, the length X of the upset part 46 is set to be longer than the wall thickness T4 of the arc-like wall portion 28, so that the rigidity is more enhanced. In general, when the bushing 20 is injection molded, the length of the upset part is preset in an equal degree of dimension to the wall thickness of the arc-like wall portion 28 adjacent to it, taking the flow of resin within a cavity into account However, this example is characterized in that the length of the upset part is made longer than the wall thickness T4 of the adjacent arc-like wall potion 28 thereby to enhance the rigidity. The length X of the upset part 46 is such that the large-diameter attachment part 12 never pushes down the upset part 46, and preferred to be 2 to 5 times the wall thickness T4 of the large-diameter attachment part 12. Thereby it is possible to enhance the rigidity of the upset part 46 while suppressing an increase in fabrication cost By the wall thickness Z of the large-diameter attachment part 12 is meant a maximum wall thickness value at an extremity side portion from the recessed portion 22 for fixation.

In the outer periphery of the bushing 20, its one end 48 on the bellows part 16 side is configured in a taper form smaller in diameter toward the tip end. Thereby it is possible to guide the large-diameter attachment part 12 by the tapered portion 48 when fitting the large-diameter attachment part 12 to the bushing 20, thus enhancing the assembling properties of both.

Figure 6:
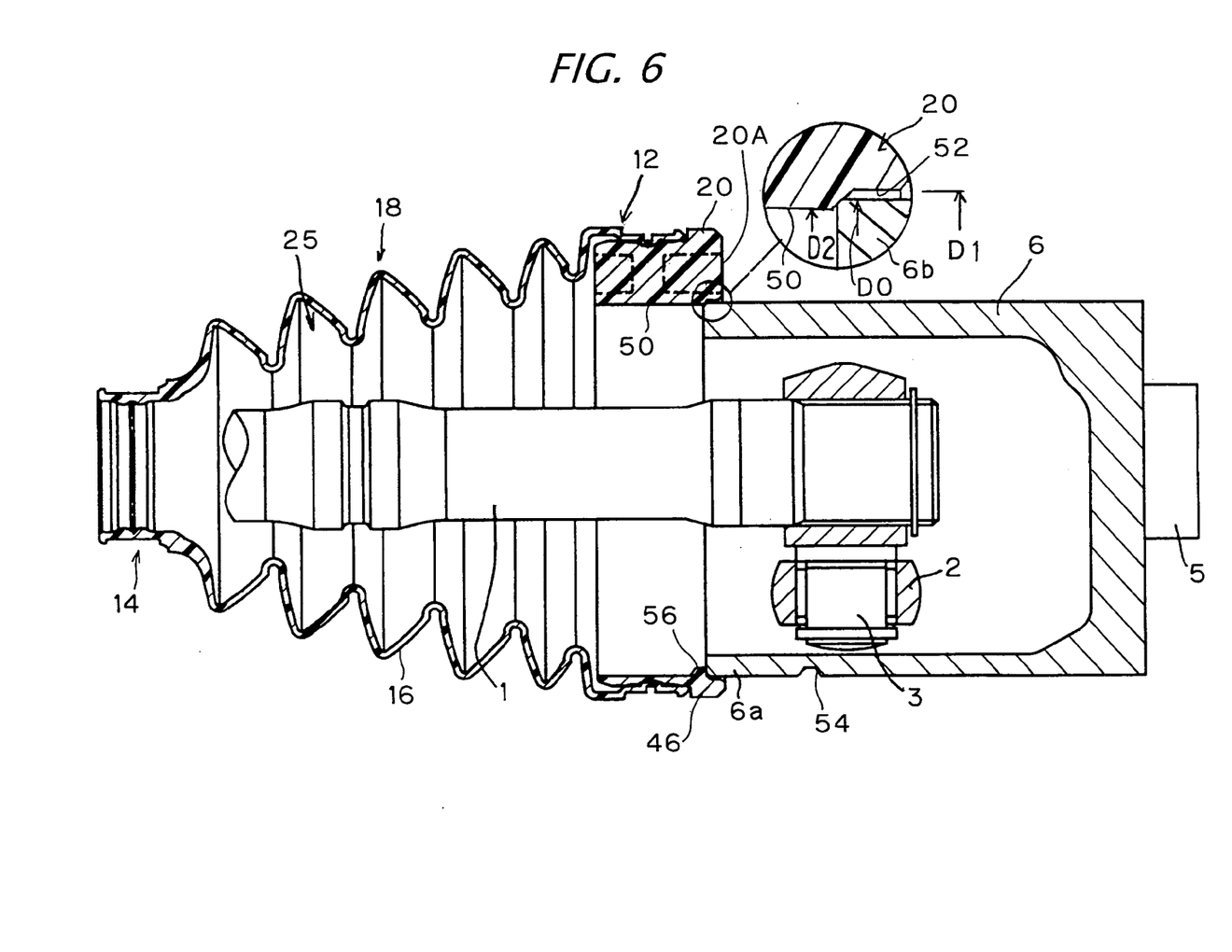
FIG. 6 is a sectional view showing the state in course of assembly of the joint boot to the constant velocity joint.

The bushing 20 is formed, on its inner peripheral surface, with a faying inner periphery portion 50 over the whole circumference thereof. That is, the faying inner peripheral portion 50 is set so that the profile of the inner peripheral surface thereof is smaller than the profile of the outer peripheral surface of the outer housing 6. Since on the inner periphery of the bushing 20, the lobe portions 26 fitting in the recessed portions 6b of the outer housing 6 are disposed in a distributed manner as described above, the inner periphery varies in radius in the circumferential direction. Therefore, the radii at the inner peripheral surface of the faying inner peripheral portion 50 are set to be smaller than radii at corresponding places of the outer housing 6 in the whole circumferential direction. For example, the radius D2 at the lobe portions 26 is preset smaller than the radius DO at the recessed portions 6b of the outer housing 6, as shown in FIG. 6. Thereby the bushing 20 is constructed so that it can be closely mated and externally fitted to the outer housing 6.

Further, the bushing 20 is formed, over the whole circumference of the inner peripheral surface at one end thereof opposite to the bellows part 16, with an upset inner peripheral portion 52 that assumes a straight hole larger in diameter than the outer housing 6 and guides the outer housing 6 when the bushing 20 is externally fitted on the outer housing 6. The upset inner peripheral portion 52 is set so that the profile of the inner peripheral surface thereof is larger than that of the outer peripheral surface of the outer housing 6, namely the radius at the inner peripheral surface of the upset inner peripheral portion 52 is larger than the radius at corresponding place of the outer housing 6 in the whole circumference thereof. For example, as shown in FIG. 6, the radius D1 at the lobe portions 26 is set to be larger than the radius D0 at the recessed portions 6b of the outer housing 6. The upset inner peripheral portion 52 is terminated not to reach the external fitting area by the large-diameter attachment part 12 in the axial direction of the bushing 20. That is, the upset inner peripheral portion 52 is disposed within the range of the axial length X of the upset part 46 from the one edge face 20A of the bushing 20, namely formed in a shorter axial dimension than the upset part 46. The boundary between the upset inner peripheral portion 52 and the faying inner peripheral portion 50 assumes a tapered hole while the boundary between the upset inner peripheral portion 52 and the one edge face 20A of the bushing 20 also assumes a tapered hole.

As shown in FIGS. 5 and 6, the outer housing 6 is provided on its outer peripheral surface with circumferentially extending grooves 54. The groove 54 is provided only in a peripheral area corresponding to the slide groove 6a of the outer housing 6, but not in a peripheral area corresponding to the recessed portion 6b.

As shown in FIGS. 5 and 7, the bushing 20 is provided on its inner peripheral surface with protrusions 56 each mating with the groove 54 above. The protrusion 56 is formed to extend in the circumferential direction only on the arc-like wall portion 28 between the lobe portions 26, corresponding to the groove 54. As shown in FIGS. 2 and 3, three protrusions 56 are present at three places on the circumference. The protrusions 56 are, in the axial direction of the bushing 20, located in a position deviating from an external fitting area Q by the large-diameter attachment part 12, namely, the area in which the bushing 20 and the large-diameter attachment part 12 mate with each other. In this example, the protrusions are located in a position deviating on the opposite side to the bellows part 16 from the external fitting area Q. More specifically, the protrusions 56 are disposed on the inner peripheral surface of the bushing 20 at the upset part 46 and between the faying inner peripheral portion 50 and the upset inner peripheral portion 52. Thus the one side of the bushing interposing the protrusions 56 constitutes the faying inner peripheral portion 50 and the other side, the upset inner peripheral portion 52.

When the joint boot 10 thus constructed is installed to a constant velocity joint, as shown in FIGS. 6 and 7, the large-diameter attachment part 12 of the boot proper 18 is fitted externally and seated on the bushing 20, thereafter, the bushing 20 is externally fitted to the outer housing 6, concurrently with which the small-diameter attachment part 14 is fitted externally to the shaft 1, and the respective damping members 7, 8 are tightened and fixed on the recessed portions for fixation 22, 24, respectively.

In externally fitting the bushing 20 to the outer housing 6, the upset inner peripheral portion 52 serves to guide the outer housing 6 and consequently, it is possible to facilitate fitting the bushing 20 externally on the outer housing 6. At that time, due to the fact that the protrusions 56 provided on the inner peripheral surface of the arc-like wall portion 28 are not situated in the external fitting area Q whose outer peripheral surface is constrained by the large-diameter attachment part 12 having a high hardness, the bushing 20 is easy to expand radially outwardly in the area of the protrusions 56, so that it is easy to insert the outer housing 6 into the bushing 20. Further at that time, because the protrusions 56 together with the upset inner peripheral portion 52 are outside the external fitting area Q, it is possible to introduce smoothly the top of the outer housing 6 from the upset inner peripheral portion 52 via the protrusions 56 into the faying inner peripheral portion 50. Moreover due to the fact that the upset inner peripheral portion 52 is provided within the range not reaching the external fitting area Q also in the circumferential area of the lobe portions 26 where the protrusions 56 are not disposed, when forcing the outer housing 6 guided by the upset inner peripheral portion 52 into the faying inner peripheral portion 50, an excessive force need not apply from initially, so that it is possible to introduce smoothly. Stated another way, if the upset inner peripheral portion 52 extends up to the external fitting area Q, an excessive force will be required from initially when forcing the outer housing 6 into the faying inner peripheral portion 50, but in this example such trouble can be solved. When the bushing 20 is mounted on the outer housing 6 in this way, the protrusions 56 mate with the grooves 54 of the outer housing 6, and the axial positioning of the bushing 20 is effected. Further, a high sealing property between the bushing 20 and the outer housing 6 is ensured because of the faying inner peripheral portion 50. To summarize, it is possible to effect the axial positioning of the bushing 20 without impairing its mountability to the outer housing 6 and to ensure a high sealing property.

Again because the axial dimension X of the upset part 46 is made longer, it is possible to prevent such a trouble that when the boot proper 18 is assembled with the bushing 20 with robot hands or manually, the large-diameter attachment part 12 of the boot proper 18 pushes down to override the upset part 46. Besides the axial dimension X of the upset part 46 is so long that on its inner peripheral surface, a sufficient axial dimension for the provision of the protrusions 56 can be secured.

Further because the inner wall portions 30 of the lobe portions 26 are each supported by the central strut wall 34A; 34B located circumferentially in the middle thereof and the lateral strut walls 36A, 36A; 36B, 36B on both sides of the former, i.e., three strut walls in total, it is possible to support the middle area of the inner wall portion 30 jutting most largely radially inwardly by the central strut wall 34A; 34B, and simultaneously to dispose the lateral strut walls 36A, 36A; 36B, 36B on both sides of the central strut wall in a manner that the tightening force can be equalized to the utmost, whereby it is possible to reduce effectively the variation in tightening force.

Additional operations can be further achieved by constructing the lateral strut walls 36A, 36B to slant in a manner such that as they extend outwardly, they approach the central strut walls 34A, 34B. That is, if the lateral strut walls 36A, 36B are disposed in parallel to the central strut walls 34A, 34B, the cross-sectional area of the relief holes 38A, 38B outside the lateral strut walls 36A, 36B is smaller, so that it will be difficult to demold the cores for molding them. On the contrary, by the slanting formation as described above, it is possible to make the cross-sectional area of the outward relief holes 38A, 38B large, thus ensuring demolding property of the cores to enhance the moldability. Further it is possible to connect the lateral strut walls 36A, 36B supporting the outside surface of the inner wall portion 30 to the inner wall portion 30 at a nearly vertical angle, and hence it is possible to equalize more the contact pressure that the inner wall portions 30 apply to the outer housing 6 in the circumferential direction, thereby enhancing the sealing properties at the lobe portions 26.

Figure 8:
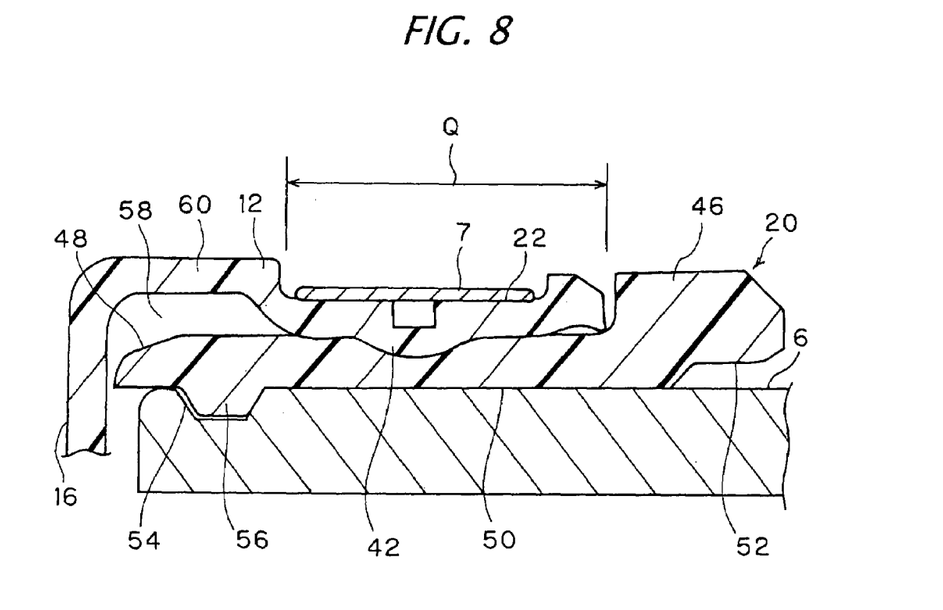
FIG. 8 is an enlarged sectional view showing essential parts of the joint boot relative to another embodiment in its assembled state to the constant velocity joint.

FIG. 8 represents a variation example regarding the arrangement position of the protrusions 56. In this example, the protrusions 56 are provided in the position deviating on the bellows part 16 side from the external fitting area Q by the large-diameter attachment part 12. In a zone of the large-diameter attachment part 12 located on the bellows part 16 side from the external fitting area Q, the bushing 12 exists and the outer periphery thereof is surrounded by the large-diameter attachment part 12. Consequently, lest the outer periphery of the bushing in that zone should be constrained by the large-diameter attachment part 12, that zone of the large-diameter attachment part 12 juts out at 60 more radially outwardly than the recessed portion for fixation 22. The inner periphery of this jutting portion 60 surrounds the outer peripheral surface of the bushing 20 at a clearance gap 58. In an axial range of the bushing 20 surrounded at the clearance gap 58, the protrusions 56 are formed on the inner peripheral surface of the bushing 20. For the purpose of mating with the protrusions 56, the grooves 54 of the outer housing 6 are also provided on the top end side of the outer housing 6 further than the case with the aforesaid embodiment. The other construction than the construction of the protrusions is similar to that of the aforesaid embodiment, and explanation thereof will be omitted, accordingly.

Also in the example shown in FIG. 7, a similar operation to the embodiment above is basically achieved, but in this case, when mounted on the outer housing 6, the area of the protrusions 56 of the bushing 20 is allowed to expand outwardly owing to the clearance gap 58, so that mountability can be secured.

INDUSTRIAL APPLICABILITY

The joint boot according to this invention enables its axial positioning without damaging the mountability to the outer housing, and can be advantageously utilized as a joint boot mainly for use in a tripod type constant velocity joint, etc. for automobiles.

DESCRIPTION OF REFERENCE CHARACTERS

1 . . . shaft, 6 outer housing, 6b . . . recessed portion, 7 . . . damping member, 10 . . . joint boot, 12 . . . large-diameter attachment part, 14 . . . small-diameter attachment part, 16 . . . bellows part, 18 . . . boot proper, 20 . . . bushing, 22 . . . recessed portion for fixation, 26 . . . lobe portion, 28 . . . arc-like wall portion, 30 . . . inner wall portion, 32 . . . outer wall portion, 34A, 34B . . . central strut wall, 36A, 36B . . . lateral strut wall, 40A . . . first relief hole, 38B, 40B . . . second relief hole, 46 . . . upset part, 48 . . . tapered portion, 50 faying inner peripheral portion, 52 . . . upset inner peripheral portion, 54 groove, 56 . . . protrusion, 58 . . . clearance gap.

The invention claimed is:

1. A joint boot comprising:
a boot body including a large-diameter attachment part adapted to attach to an outer housing having a plurality of recessed portions in the circumferential direction thereof, a small-diameter attachment part adapted to attach to a shaft, and a bellows part integrally linking said small-diameter attachment part and said large-diameter attachment part; and a bushing adapted to be interposed between said outer housing and the large-diameter attachment part, said bushing having an inner peripheral surface adapted to be externally fitted and fixed to the outer housing and having an outer peripheral surface to which said large-diameter attachment part of said boot body is externally fitted, wherein said bushing has a circular form in cross-section on said outer peripheral surface thereof, wherein said bushing has a plurality of lobe portions on said inner peripheral surface thereof in a circumferentially distributed manner, said plurality of lobe portions being adapted to mate with said recessed portions;

wherein the bushing has protrusions extending circumferentially on said inner peripheral surface adapted to mate with grooves extending circumferentially on an outer peripheral surface of the outer housing;

wherein said large-diameter attachment part of said boot body is externally fitted to and in contact with said bushing with a clamping member in an external fitting area, and wherein the protrusions are disposed in said bushing in a position that is axially outside said clamping member and said external fitting area.

2. The joint boot as set forth in claim 1, wherein the protrusions are disposed on an opposite side of said external fitting area, relative to said bellows part of said boot body.

3. A joint boot as set forth in claim 2, wherein an upset part capable of stopping an edge face of the large-diameter attachment part in the axial direction is formed in said outer peripheral surface of said bushing, and wherein the protrusions are disposed on the inner peripheral surface of the bushing at a same axial position as the upset part in the axial direction of the bushing.

4. The joint boot as set forth in claim 3,
wherein the bushing is provided with a faying inner peripheral portion of a smaller diameter than the outer housing over the whole circumference of the inner peripheral surface of said bushing, so that the bushing is adapted to be externally fitted and fayed to the outer housing, wherein the bushing is provided with an upset inner peripheral portion over the whole circumference of the inner peripheral surface located at an end of the bushing opposite to the bellows part, assuming a straight hole form of a larger diameter than the outer housing and guiding the outer housing when externally fitting the bushing to the outer housing; and wherein the protrusions are disposed between the faying inner peripheral portion and the upset inner peripheral portion.

5. The joint boot as set forth in claim 1, wherein the protrusions are disposed between said bellows part of said boot body and said external fitting area in the axial direction of the bushing.

6. The joint boot as set forth in claim 5,
wherein the large-diameter attachment part is provided with a circumferentially extending recessed portion on the outer peripheral surface of said large-diameter attachment part, to which said clamping member is received; and wherein an inner peripheral area of the large-diameter attachment part located between said bellows part of said boot body and said circumferentially extending recessed portion surrounds the outer peripheral surface of the bushing at a clearance gap, and wherein the protrusions are disposed on the inner peripheral surface of the bushing within an axial range of the clearance gap.

7. The joint boot as set forth in claim 1, wherein the protrusions are provided only at arc-shaped wall portions located between the circumferentially mutually adjacent lobe portions.

8. The joint boot as set forth in claim 1, wherein the bushing is formed from a softer material than the boot body.

9. The joint boot as set forth in claim 1, wherein the lobe portions of the bushing each comprise:

an inner wall portion jutting radially inwardly in a curved form, an outer wall portion constituting part of the outer peripheral surface of the bushing, a radially extending central strut wall connecting the inner wall portion and the outer wall portion in the middles thereof relative to the circumferential direction, and lateral strut walls on both sides of the central strut wall, whereby four relief holes are juxtaposed in the lobe portion in the circumferential direction.

10. The joint boot as set forth in claim 9, wherein the lateral strut walls slant in a manner such that as the lateral strut walls extend towards an outer peripheral portion of said bushing, the lateral strut wall approach the central strut wall.

* * * * *